United States Patent [19]

Faigle et al.

[11] Patent Number: 5,100,171
[45] Date of Patent: Mar. 31, 1992

[54] FILTER ASSEMBLY FOR AIRBAG INFLATOR

[75] Inventors: Ernst M. Faigle, Imlay City; John H. Semchena, Royal Oak, both of Mich.

[73] Assignee: TRW Vehicle Safety Systems Inc., Lyndhurst, Ohio

[21] Appl. No.: 605,397

[22] Filed: Oct. 29, 1990

[51] Int. Cl.⁵ .............................................. B60R 21/26
[52] U.S. Cl. ................................... 280/736; 280/741
[58] Field of Search ............... 280/728, 731, 732, 736, 280/741

[56] References Cited

U.S. PATENT DOCUMENTS

| | | |
|---|---|---|
| 3,972,545 | 8/1976 | Kirchoff et al. .................... 280/736 |
| 4,005,876 | 2/1977 | Jorgensen et al. .................. 280/741 |
| 4,017,100 | 4/1977 | Gehrig et al. ...................... 280/736 |
| 4,137,847 | 2/1979 | Osborne ............................ 280/741 |
| 4,156,696 | 6/1979 | Wilhelm ............................ 280/736 |
| 4,578,247 | 3/1986 | Bolieau ............................ 280/741 |
| 4,878,690 | 11/1989 | Cunningham ...................... 280/741 |

Primary Examiner—Kenneth R. Rice
Attorney, Agent, or Firm—Tarolli, Sundheim & Covell

[57] ABSTRACT

An inflator for a vehicle occupant safety apparatus including an inflatable airbag has a filter which removes undesirable combustion products without detrimentally reducing the pressure of the gas flow into the inflating airbag. The filter comprises a plurality of spaced apart filter layers having offset gas flow openings to define tortuous gas flow paths through the filter.

11 Claims, 6 Drawing Sheets

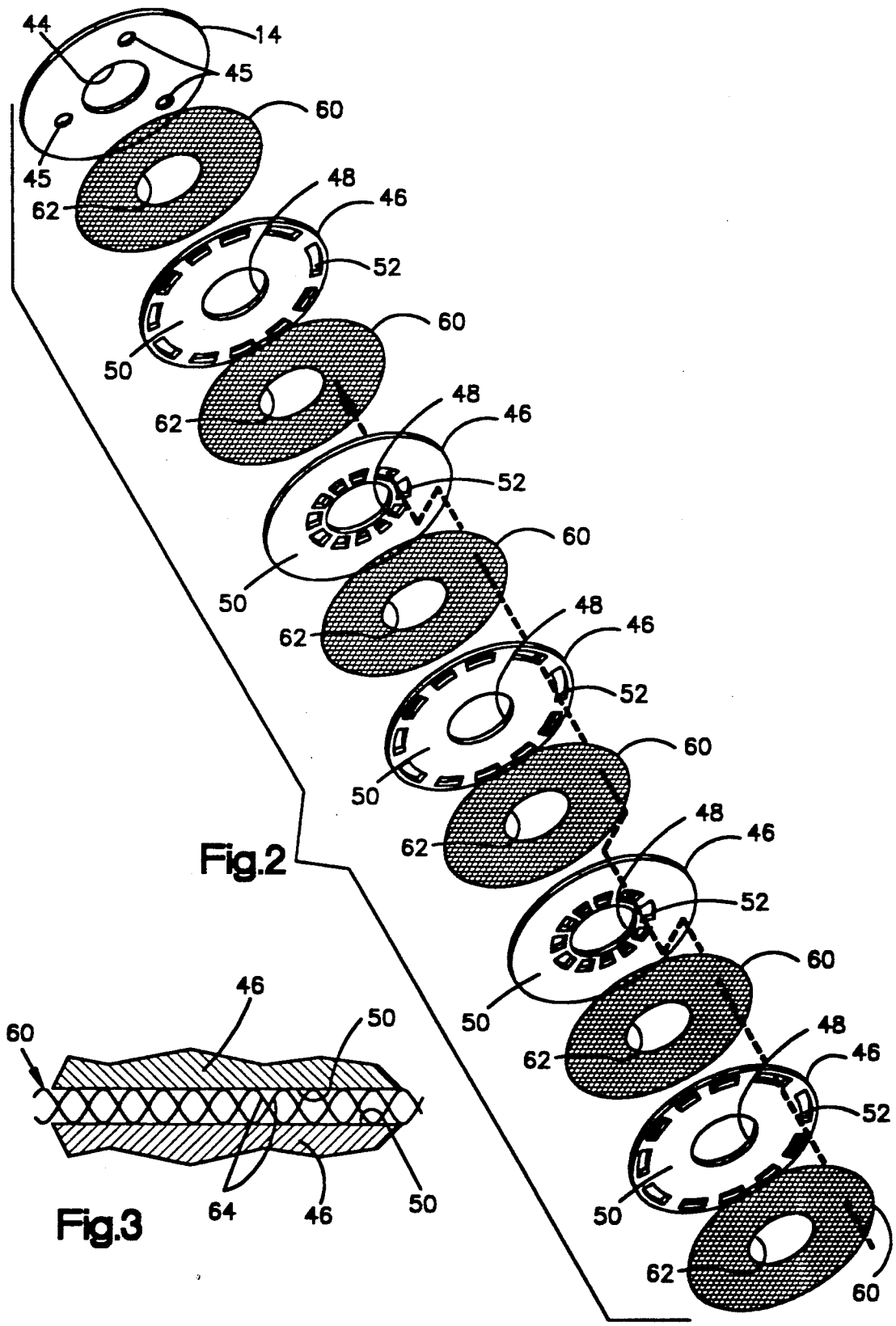

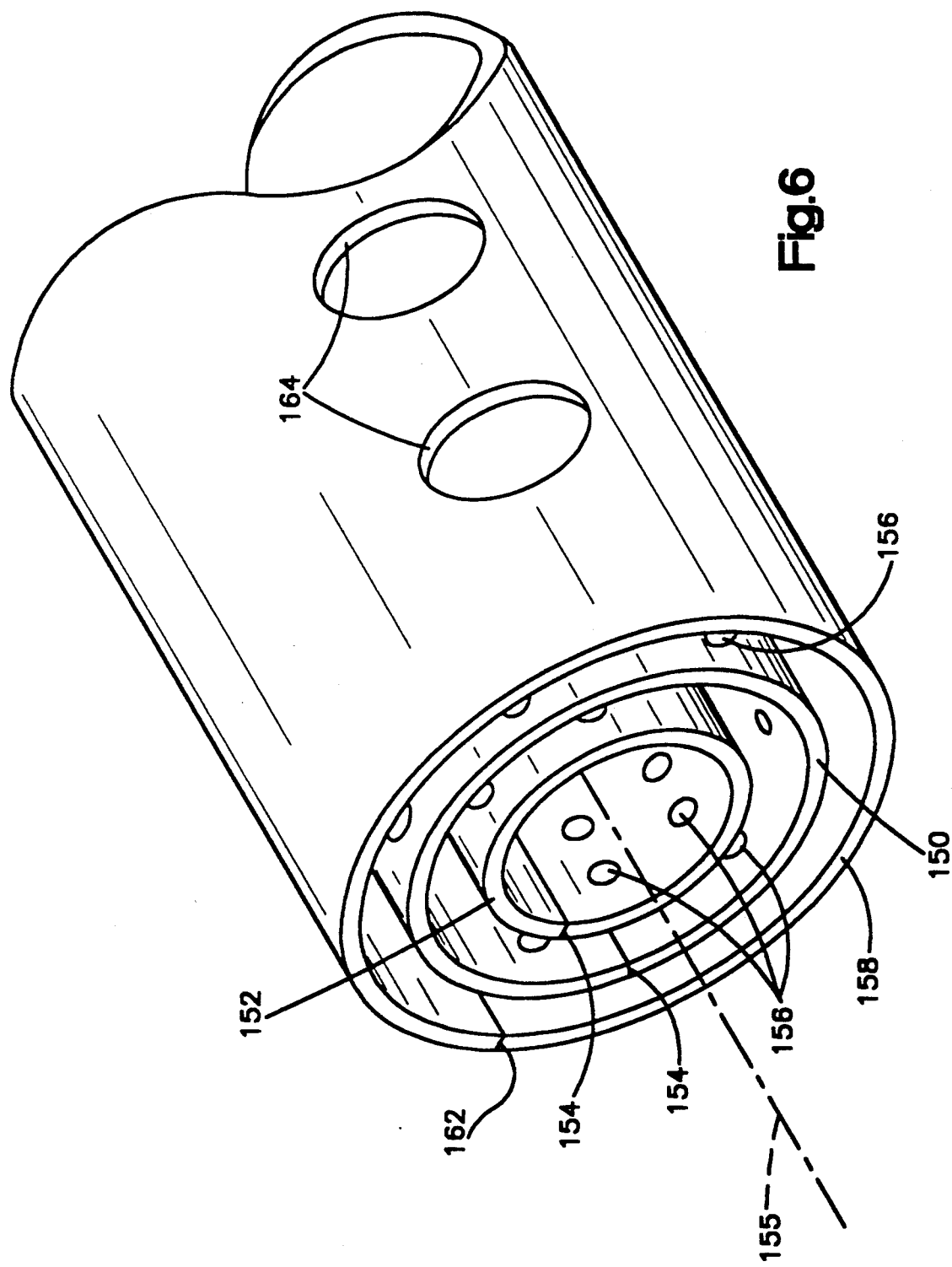

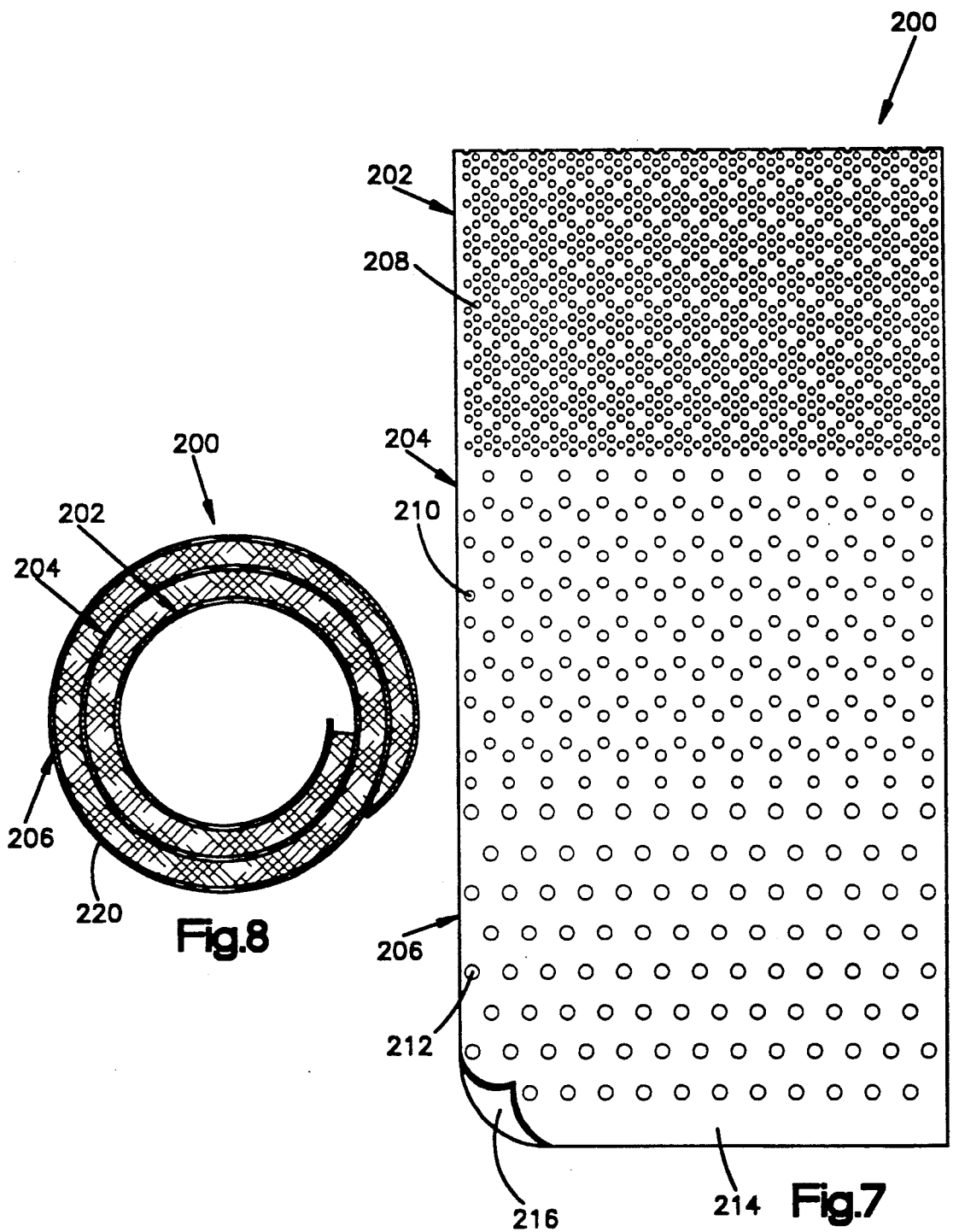

FILTER ASSEMBLY FOR AIRBAG INFLATOR

FIELD OF THE INVENTION

The present invention relates to a vehicle occupant safety apparatus, and particularly relates to a vehicle occupant safety apparatus which includes an inflatable airbag.

BACKGROUND OF THE INVENTION

An inflatable airbag is employed as a safety device for an occupant of a vehicle. An airbag is inflated by gas generated by combustion of gas generating material. When the vehicle experiences a crash, a crash sensor sends a signal to an ignitor which ignites the gas generating material. The gas is directed into the airbag to cause inflating movement of the airbag into the vehicle occupant compartment for restraint of an occupant of the vehicle.

Ignition and combustion of the gas generating material generates gas at elevated levels of pressure and temperature. The gas carries vaporized, molten, and particulate products of combustion. The heat and the products of combustion could damage the airbag. A filter is therefore required to cool the gas and to remove the vaporized, molten and particulate products of combustion. However, the filter should not inhibit rapid inflating movement of the airbag into the vehicle occupant compartment.

U.S. Pat. No. 4,017,100 discloses a filter for the gas which is generated to inflate an airbag. The filter is located within a housing between gas generating material and ga exit openings in the housing. The filter includes layers of filter material arranged in three adjacent groups. Layers of the first group are screens which provide structural support for the layers of the other groups. Layers of the second group are formed of glass fibers, and serve as filtering layers. Layers of the third group are formed of steel wool, and also serve as filtering layers. An additional structural support screen is provided on each side of the third group of layers, and a perforated metal plate separates the filter layers from the gas generating material. The successive layers of filtering material decrease in porosity in the downstream direction of gas flow through the filter. The successively lesser values of porosity are designed to remove particles progressively from the gas as the gas moves in a substantially linear path through the filter.

Another type of gas filter for a vehicle occupant safety apparatus is shown in U.S. Pat. No. 3,972,545. The '545 patent discloses an elongated cylindrical housing in which gas flows from a gas generating material to gas exit openings through a plurality of filter layers. The filter layers include a pair of perforated plates which support a plastic bag containing PH neutralizing material, and axially alternating groups of fine and coarse wire screens. A third perforated plate separates the screens from the gas exit openings in the housing. The gas travels axially through the filter in a substantially linear path.

U.S. Pat. Nos. 4,017,100 and 3,972,545 disclose two types of filters used to filter gas for inflating an airbag. Other patents and the technical literature disclose a multitude of filter structures. Most, if not all, of the filter structures include wire screen, steel wool and/or ceramic material to filter the gas. Typically, combinations of these materials are used. In the fabrication of a filter structure and assembly of a filter structure with other parts, steel wool and ceramic filters can become damaged.

SUMMARY OF THE INVENTION

In accordance with the present invention, a filter is provided for removing material from gas generated by a gas generating material in a vehicle occupant safety apparatus. The safety apparatus includes an inflatable airbag and a housing. The airbag restrains a vehicle occupant when inflated by the gas. The housing contains the gas generating material, and has at least one gas exit opening. The filter comprises a plurality of filter layers. Each filter layer has parallel opposite side surfaces, and at least one gas flow opening extending between the side surfaces. The filter layers are arranged in adjacent positions with spaces between the side surfaces of adjacent filter layers. Each filter layer has a side surface area opposite each gas flow opening in an adjacent filter layer. A tortuous gas flow path is thereby defined through the spaces and the gas flow openings. The filter layers are receivable in the housing in their adjacent positions, with the tortuous gas flow path extending between the gas generating material and the gas exit opening.

The filter functions to remove undesirable combustion products from the gas without detrimentally inhibiting the gas flow into the inflating airbag. The filter therefore does not inhibit rapid inflating movement of the airbag into the vehicle occupant compartment. Since a side surface area of a filter layer is opposite each gas flow opening in an adjacent filter layer, gas flowing through a gas flow opening will move against the opposed side surface area of the next adjacent filter layer before turning to continue along the tortuous gas flow path through a gas flow opening in the next adjacent filter layer. Movement of the gas against the side surfaces of the filter layers enables hot vaporized combustion products to condense against the cooler surface areas of the filter layers. As the gas turns along the tortuous path, molten material carried with the gas will collide with and plate out onto the cooler surface areas of the filter layers. Particulate combustion products carried with the gas will also collide with the side surfaces and become trapped in the filter. Importantly, the gas can flow through the gas flow openings and the spaces between the adjacent side surfaces without being inhibited by the surfaces which collect filtered materials or by the filtered materials themselves.

Since the gas traverses a tortuous path through the filter, its residence time in the filter is sufficient to enable cooling as well as filtering of the gas to occur.

In accordance with another feature of the invention, a filter for a vehicle occupant safety apparatus comprises a plurality of filter layers with each filter layer having parallel opposite sides surfaces and at least one gas flow opening, and with each side surface having a total surface area greater than the total gas flow opening area at that side surface. The filter layers are arranged in adjacent positions with spaces between the side surfaces of adjacent filter layers. Each filter layer has a side surface area opposite a gas flow opening at an adjacent filter layer to define a tortuous gas flow path through the spaces and the gas flow openings. A filter in accordance with this feature of the invention can provide greater side surface areas for removing material from the gas.

In accordance with a preferred embodiment of the invention the filter layers are disk shaped baffle plates in parallel coaxial positions, and the gas flow openings are formed as arcuately shaped slots in the baffle plates. The slots of each baffle plate are offset radially from the slots of an adjacent baffle plate so that a side surface area of each baffle plate is located opposite each slot in an adjacent baffle plate. The offset slots and opposed side surface areas of adjacent baffle plates define a tortuous gas flow path which extends radially through the spaces between adjacent baffle plates, and which alternates in opposite radial directions as the gas moves axially past successive pairs of adjacent baffle plates.

The preferred embodiment of the invention also includes an individual screen between each adjacent pair of baffle plates. The screens serve to space the baffle plates apart, and also serve to filter out materials which do not move directly against the side surfaces of the baffle plates.

In an alternate embodiment of the invention, the filter layers are cylinders in radially adjacent positions. In another alternate embodiment, the filter layers are radially adjacent sections of a coil shaped filter sheet.

In accordance with an additional feature of the present invention, a wire mesh container is provided to contain the gas generating material. The wire mesh container effects an initial filtering of the gas being directed into the airbag. Relatively large particulate materials are retained inside the wire mesh container.

BRIEF DESCRIPTION OF THE DRAWINGS

These and other features of the present invention will become apparent to those skilled in the art upon reading the following description of preferred embodiments of the invention with reference to the accompanying drawings in which:

FIG. 2 is an exploded perspective view of the elements of a modular component of the airbag inflator of FIG. 1;

FIG. 3 is a partial side view of elements of the modular component of FIG. 2;

FIG. 6 is a partial perspective view of parts of an airbag inflator in accordance with another alternate embodiment of the present invention;

FIG. 7 is a plan view of a component of an airbag inflator in accordance with ye another alternate embodiment of the present invention;

FIG. 8 is a side sectional view of a filter including the component of FIG. 7.

DESCRIPTION OF PREFERRED EMBODIMENTS

Figure 1:
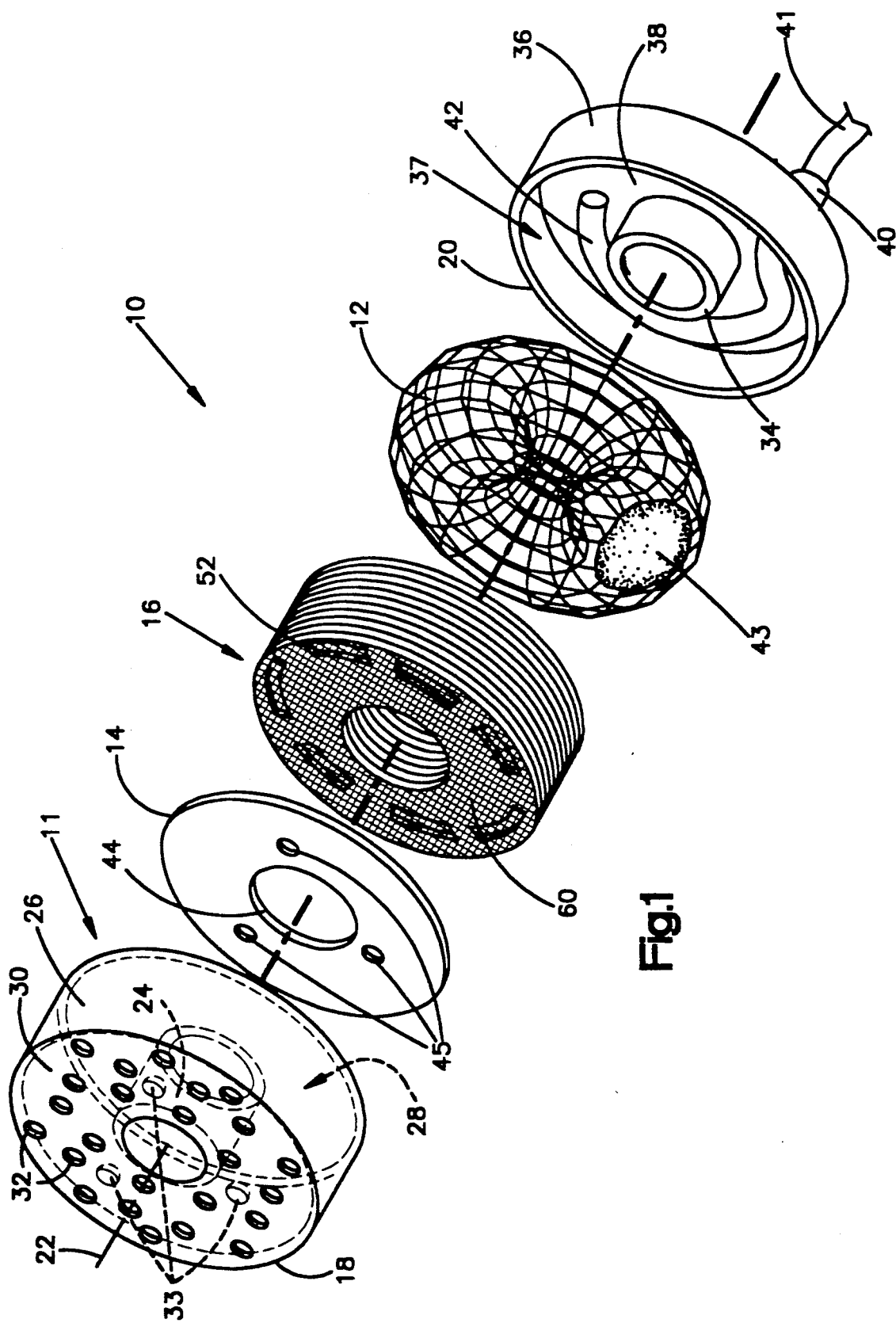
FIG. 1 is an exploded perspective view of the components of an airbag inflator in accordance with the present invention.

FIG. 1 illustrates an inflator 10 for a vehicle occupant safety apparatus in accordance with a preferred embodiment of the present invention. The safety apparatus includes an inflatable airbag (not shown). The inflator 10 comprises a housing 11, a propellant mesh sock 12, a burst foil sheet 14, and a filter module 16.

The housing 11 includes an upper housing member 18 and a lower housing member 20. The upper housing member 18 has an axis 22, a cylindrical inner wall 24, and a cylindrical outer wall 26 which is coaxial with the cylindrical inner wall 24. An upper annular space 28 is defined between the inner and outer walls 24 and 26. The upper housing member 18 also includes a forward wall 30 having gas exit openings 32 which communicate the annular space 28 with the exterior of the housing 11. Bosses 33 project axially from the inside surface of the forward wall 30.

The lower housing member 20 comprises a cylindrical inner wall 34 and a cylindrical outer wall 36. The cylindrical walls 34 and 36 of the lower housing member 20 are coaxial with the cylindrical walls 24 and 26 of the upper housing member 18, and define a lower annular space 37. The lower housing member 20 further includes a rear wall 38, and a tubular connector 40 for communicating the lower annular space 37 with the exterior of the lower housing member 20. The tubular connector 40 is adapted to connect a linear pyrotechnic transmission line 41 with a linear ignition line 42 that extends within the lower annular space 37. The linear pyrotechnic transmission line 41 is preferably a product known by the trademark "TLX", a trademark of Explosive Technology, Inc. of Fairfield, Calif. The linear ignition line 42 is preferably a product known by the trademark "ITLX", also a trademark of Explosive Technology, Inc. The linear pyrotechnic transmission line 41 transmits an ignition signal in a known manner.

The upper housing member 18 is receivable on the lower housing member 20 such that the upper and lower annular spaces 28 and 37 together define an annular chamber extending from the rear wall 38 at the lower housing member 20 axially to the forward wall 30 at the upper housing member 18.

The propellant mesh sock 12 is a woven wire member having a endless tubular shape to fit closely within the annular chamber in a position adjacent to the rear wall 38. The mesh sock 12 contains a gas generating material 43 shown schematically in FIG. 1. The woven wire mesh structure of the mesh sock 12 provides an initial filtering stage for the inflator 10.

The gas generating material 43 may be made of an alkali metal azide compound. Those compounds are represented by the formula $MN_3$ where M is an alkali metal, preferably sodium or potassium and most preferably sodium. The gas generating material 43 is preferably made of a material as disclosed in U.S. Pat. No. 4,817,828, assigned to TRW Automotive Products Inc. Such materials includes 61 to 68% by weight of sodium azide, 0 to 5% by weight of sodium nitrate, 0 to 5% by weight of bentonite, 23 to 28% by weight of iron oxide, 2 to 6% by weight of graphite reinforcing fibers and 1 to 2% of fumed silicon dioxide. Preferably, the composition of the grain is 63% by weight of sodium azide, 2.5% by weight of sodium nitrate, 2% by weight of bentonite, 26.5% by weight of iron oxide, 4% by weight of graphite reinforcing fiber and 2% by weight of fumed silicon dioxide. The fumed silicon dioxide is sold under the trademark CAB-O-SIL by Cabot Manufacturing Company with a product designation EH5. The graphite reinforcing fibers are 3-67 microns in diameter and 40 to 80 thousandths of an inch in length.

The burst foil sheet 14 is a ring shaped disk with a central opening 44 such that the burst foil sheet 14 will fit closely within the annular chamber in a position between the forward wall 30 of the housing 11 and the filter module 16. The burst foil sheet 14 blocks the gas exit openings 32, and is adapted to burst under a predetermined level of gas pressure to allow gas to exit from the housing 11 through the gas exit openings 32. Apertures 45 in the burst foil sheet 14 permit placement of the burst foil sheet 14 over the bosses 33 in a position flush with the forward wall 30. Preferably, the burst foil sheet 14 is held in place against the forward wall 30 by an adhesive.

As shown in FIGS. 2 and 3, the filter module 16 comprises a plurality of filter layers in adjacent spaced apart positions. In the preferred embodiment, the filter layers are disk shaped steel baffle plates 46 in coaxial positions. Each baffle plate 46 has a central opening 48, opposite planar side surfaces 50 parallel to each other, and gas flow openings 52. Each side surface 50 of a baffle plate 46 has a surface area which is greater than the combined area of the gas flow openings 52 at the side surface 50. The combined areas of the gas flow openings 52 is approximately the same at each side surface 50 of each baffle plate 46, and is approximately equal to the combined area of the gas exit openings 32 at the forward wall 30 of the housing 11. All or some of the approximately equal gas flow areas in the preferred embodiment could be made equal. The gas flow openings 52 are arcuately shaped slots extending in a circular array around the central openings 48. The gas flow openings 52 in each baffle plate 46 are offset radially from the gas flow openings 52 in each adjacent baffle plate 46 such that an area of a side surface 50 is located axially opposite each gas flow opening 52. The gas flow openings 52 in this preferred embodiment of the invention are offset entirely so that a side surface area is opposite the entire area of each gas flow opening 52.

The filter module 16 further comprises a plurality of stainless steel screens 60. The screens 60 are also flat disks with central openings 62. The baffle plates 46 and the screens 60 are coaxially arranged in a stacked array in which baffle plates 46 and screens 60 alternate. A single screen 60 is located between each adjacent pair of baffle plates 46. The screens 60 serve to space apart the side surfaces 50 of the baffle plates 46, and also serve as filter layers. Preferably, the screens 60 are formed of crimped or undulating wires 64 as shown in FIG. 3 to facilitate gas flow both axially and radially through the spaces between the side surfaces 50 of the baffle plates 46.

The baffle plates 46 and the screens 60 define tortuous gas flows path extending axially through the filter module 16. One such tortuous gas flow path is indicated by the arrow shown in FIG. 2. Gas flowing axially through the gas flow opening 52 will move against the opposed area of a side surface 50, and will be deflected to flow radially through the space between adjacent side surfaces 50 to reach a gas flow opening in the next successive baffle plate 46. The radial direction of the tortuous gas flow path reverses between successive pairs of adjacent baffle plates 46.

When the baffle plates 46 and the screens 60 are stacked closely to form the filter module 16 as shown in FIG. 1, the filter module 16 is receivable in the chamber of the housing 11 in an interference fit against the cylindrical housing walls to block gas flow axially between the filter module 16 and the cylindrical housing walls. Alternately, a sleeve may be provided around the filter module 16 for the same purpose. The bosses 33 on the front wall 30 of the housing 11 hold the filter module 16 away from the front wall 30 so that the forward-most baffle plate 46 will not block the gas exit openings 32.

When a crash sensor carried on the vehicle reacts to a crash by sending an ignition signal to the inflator 10 through the linear pyrotechnic transmission line 41, the ignition signal is transmitted through the tubular connector 40 to the linear ignition line 42. The linear ignition line 42 then ignites and emits products of combustion which pass through the wire mesh structure of the mesh sock 12 to ignite the gas generating material 43 contained in the mesh sock 12. Ignition and combustion of the gas generating material 43 releases gas which carries vaporized and particulate products of combustion, as well as molten metal, which could damage the airbag. The gas is constrained by the walls of the housing 11 to flow axially toward the gas flow openings 32 at elevated levels of temperature and pressure, and is directed through the filter module 16 for cooling and filtering.

As the gas follows tortuous paths through the filter module 16 as indicated in FIG. 2, it moves against the spaced apart side surfaces 50 of the baffle plates 46 as it flows radially between successive, offset gas flow openings 52. The screens 60 induce turbulence in the flowing gas to assure that the gas makes substantial contact with both of the adjacent side surfaces 50 of an adjacent pair of baffle plates 46.

The baffle plates 46 are initially cooler than the hot gas emerging from the gas generating material 43, and vaporized combustion products therefore condense against the side surfaces 50. Also, molten metal carried by the gas plates out onto the cooler side surfaces 50. Compared with a fibrous filter layer, a steel wool filter layer, or a screen, a baffle plate 46 provides a continuous surface area surrounding the gas flow openings 52 for condensation of vaporized combustion products and for plating out of molten metal. Also, being formed of a material impervious to the gas, the baffle plates 46 permit the gas to flow only through the perforations or stamped out areas defining the gas flow openings 52. The gas is thereby directed to flow only in a tortuous path as opposed to a straight path which could be followed through filter layers which do not have continuous impervious surface areas, such as fibrous filter layers, steel wool filter layers, and screens alone.

Compared with a substantially linear gas flow path, the tortuous ga flow path in accordance with the invention directs the moving gas against a more extensive surface area for condensation and plating out of molten metal. As shown in FIG. 2, a tortuous gas flow path through the filter module 16 includes radial components and axial components. The radial components of the tortuous gas flow path have lengths defined by the radial distance between the offset gas flow openings 52. The axial components of the tortuous gas flow path have lengths defined by the thickness of the baffle plates 46 plus the spacing between adjacent baffle plates 46. Preferably, the radial components of the tortuous gas flow path are longer than the axial components. The gas therefore moves against the side surfaces 50 of the baffle plate 46 along a majority portion of the overall length of the tortuous gas flow path extending axially through the filter module 16. Additionally, it takes a longer time for flowing gas to traverse a tortuous path than to traverse a linear path of equal axial length. The baffle plates 46 thereby enable condensation of vapors and cooling of the gas to continue for a relatively long time. The gas is cooled in the filter module 16 from approximately 2200 degrees F. to approximately 600-800 degrees F.

The filter module 16 also removes undesirable particulate products of combustion from the flowing gas. The largest particles in the gas are retained in the mesh sock 12. As the gas flows through the filter module 16 in a tortuous path as shown in FIG. 2, particulates carried with the gas will tend inertially to continue in linear paths, and consequently will be trapped by the baffle plates 46 and the screens 60. Unlike the closely spaced, narrow openings in fibrous filter layers, the relatively wider, spaced apart gas flow openings 52 in the baffle plates 46 will not become blocked by particulates trapped on the baffle plates 46. The passage of particulates through the filter module 16 is thereby inhibited without excessively inhibiting the pressurized gas flow required to inflate an airbag. Importantly, filtering of the gas without excessively inhibiting the pressurized flow allows a lesser amount of gas generating material 43 to be used for inflation of the airbag.

When the filtered gas emerges from the filter module 16, the burst foil sheet 14 blocks the gas from flowing out through the gas exit openings 32 in the housing 11 until the pressure of the gas reaches a predetermined level. The burst foil sheet 14 then bursts to permit a sudden rush of pressurized ga into the airbag.

The number of baffle plates 46 and screens 60 used in a filter module in accordance with the invention may vary. As the number of baffle plates 46 is increased, the combined areas of the side surfaces 50 is increased. The area of the gas flow openings 52 can then be increased while still maintaining a substantial portion of the gas flow path between adjacent side surface areas for condensation and entrapment of combustion products. Larger gas flow openings would permit a less restricted flow of gas toward the airbag. An optimum ratio of side surface area to gas flow opening area would differ for differing temperature and pressure levels desired at the gas exit openings in the housing, and for differing gas generating materials. In practice of the invention it is found that a filter module having five baffle plates 46 and six screens 60 in individually alternating positions as shown in FIG. 2 provides the best results. However, satisfactory results are also obtained with a filter module having three baffle plates and three screens between each adjacent pair of baffle plates. The baffle plates 46 shown in FIG. 2 have a diameter of 3.15 inch, a thickness of 0.06 inch, and are spaced apart by approximately 0.124 inch. One side of a baffle plates 46 having the radially outer array of gas flow openings 52 has a side surface area of approximately 5.74 square inches and a gas flow opening area of approximately 0.84 square inches. One side of a baffle plate 46 having the radially inner array of gas flow openings 52 has a side surface area of approximately 5.88 square inches and a gas flow opening area of approximately 0.70 square inches. The screens 60 may vary in mesh size as well as in number to include coarse mesh screens having a wire diameter of 0.062 inch and 60 openings per square inch, medium mesh screens having a wire diameter of 0.031 inch and 144 openings per square inch, and fine mesh screens having a wire diameter of 0.027 inch and 380 openings per square inch.

Figure 4A:
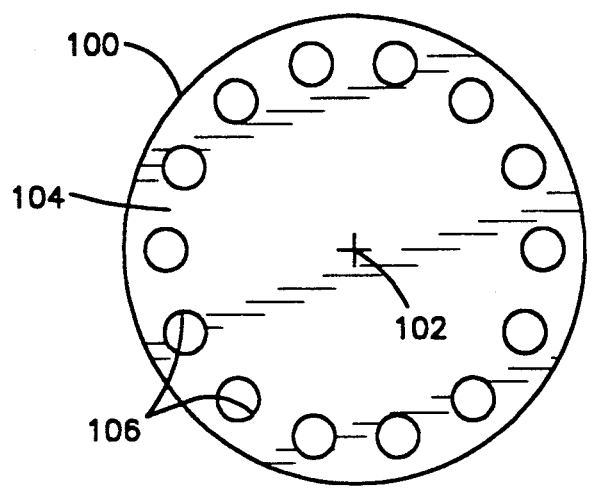
FIGS. 4a and 4b show alternate embodiments of components of an airbag inflator filter in accordance with the present invention.
Figure 4B:
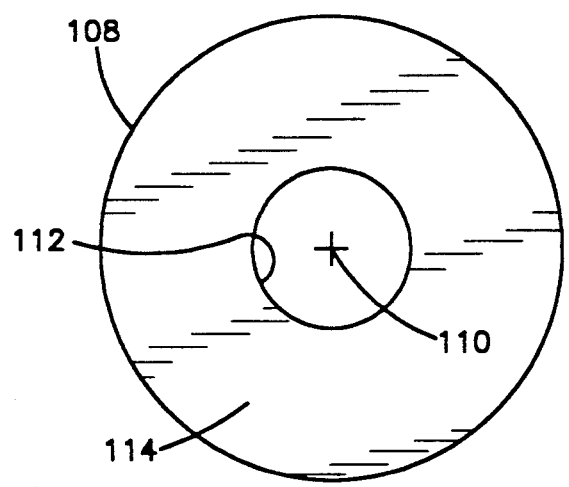

Baffle plates in accordance with an alternate embodiment of the invention are shown in FIGS. 4a and 4b. A baffle plate 100 as shown in FIG. 4a is a flat steel disk with an axis 102, parallel opposite side surfaces 104, and a circular array of gas flow openings 106. The total area of a side surface 104 is greater than the total combined area of gas flow openings 106 at the side surface 104. Preferably, a side surface 104 has a total area of 2.33 square inches, and the fourteen gas flow openings 106 shown have a total combined area of 1.08 square inches in the plane of a side surface 104. A baffle plate 108 as shown in FIG. 4b is a flat steel disk with an axis 110, a central opening 112, and parallel opposite side surfaces 114. The total area of a side surface 114 is greater than the area of a central opening 112 at the side surface 114. Preferably, a side surface 114 has a total area of 2.30 square inches and a central opening 112 has an area of 1.11 square inches.

Figure 5:
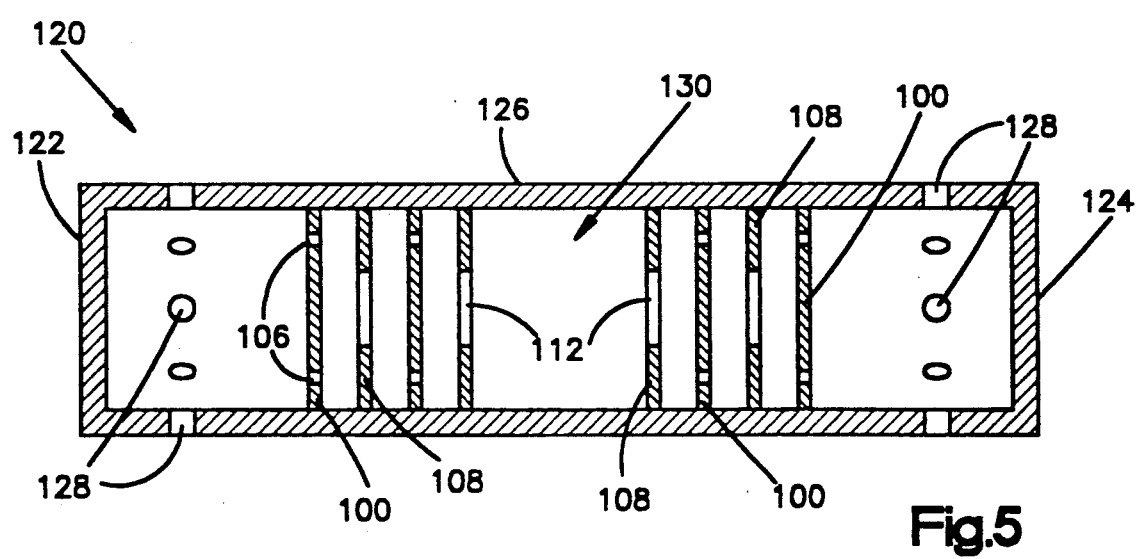
FIG. 5 is a sectional view of an airbag inflator in accordance with an alternate embodiment of the present invention.

FIG. 5 shows the baffle plates 100 and 108 inside a housing 120. The housing 120 has an elongated cylindrical shape with opposite end walls 122 and 124, and a cylindrical outer wall 126. The cylindrical outer wall 126 has a circumferentially extending array of gas exit openings 128 adjacent to each end wall 122, 124. The gas exit openings 128 are adapted to direct gas into an airbag at the passenger side of a vehicle. The housing 120 also includes an internal space 130 for containing a gas generating material such as the material 43.

The baffle plates 100 and 108 ar arranged in the housing 120 in two groups. Each group of baffle plates 100 and 108 is located between the interior space 130 and an array of gas exit openings 128. The baffle plates 100 and 108 in each group are arranged in adjacent, spaced apart coaxial positions, with the baffle plates 100 and 108 alternating in an axial sequence. Screens may also be included with the baffle plates 100 and 108 as described above with reference to the filter module 16.

Gas generated by a gas generating material contained in the internal space 130 is directed to flow in tortuous paths past each group of baffle plates 100 and 108 to each array of gas exit openings 128. Gas flowing axially through a central opening 112 in a baffle plate 108 flows against an area of the side surface 104 of the next adjacent baffle plate 100. The gas then turns radially outward toward the circular array of gas flow openings 106 in the baffle plate 100. Gas flowing axially through a gas flow opening 106 flows against an area of the side surface 114 of the next adjacent baffle plate 108, and then turns radially inward toward the central opening 112 in the baffle plate 108. The radial components of a tortuous gas flow path defined by a group of baffle plates 100 and 108 reverse directions between successive pairs of alternating baffle plates 100 and 108 until the flowing gas reaches the gas exit openings 128.

The baffle plates 100 and 108 shown in FIGS. 4a, 4b and 5 could alternately be used in a housing such as the housing 11 shown in FIG. 1, with the central gas flow openings 112 in the baffle plates 108 being sized to define annular gas flow passages extending circumferentially around the cylindrical inner walls 24 and 34 of the housing 11.

Filter layers in accordance with another alternate embodiment of the invention are shown in FIG. 6. The filter layers 150 and 152 are formed from flat sheets which are rolled into cylindrically shaped tubes. Edge surfaces of the flat sheets are placed in abutting contact to define seams 154, and can be adhered together by welding or other conventional fastening methods. The filter layers 150 and 152 are spaced apart in radially adjacent positions, and preferably are centered on an axis 155. Each filter layer 150 and 152 has parallel opposite side surfaces, and has gas flow openings 156 which are offset in accordance with the invention to define tortuous gas flow paths extending radially outwardly.

A housing 158 contains the filter layers 150 and 152 at the passenger side of the vehicle. The housing 158 is elongated along the axis 155, and is similarly formed as a cylindrically shaped tube with abutting edge surfaces defining a seam 162. The housing 158 has gas exit openings 164 to direct gas from the filter layers 150 and 152 to an airbag. An airbag inflator including the filter layers 150 and 152 would also include a gas generating material within the inner filter layer 152, and could include one or more screens between the filter layers 150 and 152. A propellant mesh sock in accordance with the invention could be formed with an elongated shape to fit within the inner filter layer 152, and additional cylindrical filter layers and screens could be included.

Figure 9:
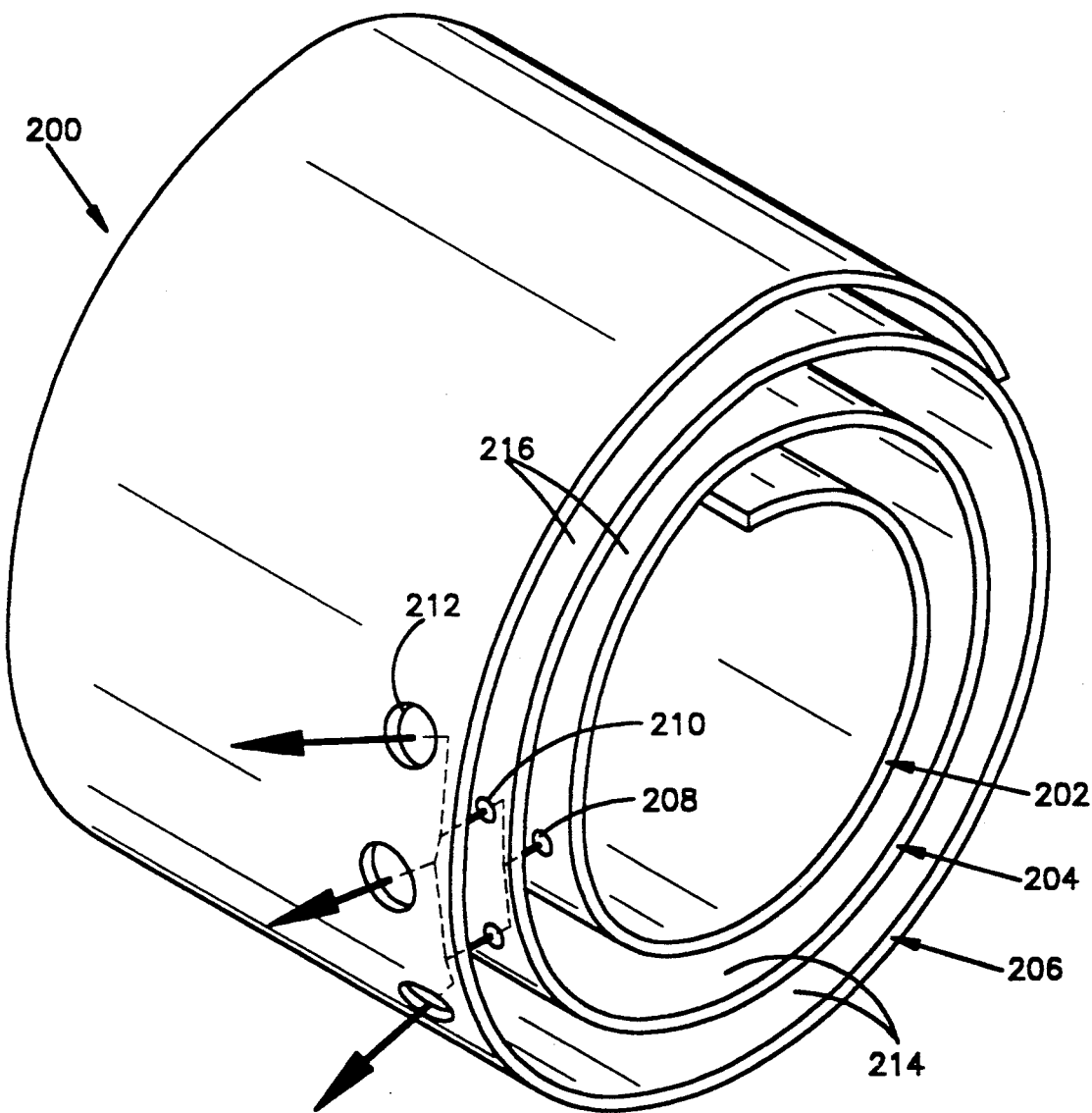
FIG. 9 is a partial perspective view of a filter including the component of FIG. 7.

An additional embodiment of the invention is shown in FIGS. 7-9. As shown in FIG. 7, a filter sheet 200 has a first section 202, a second section 204, and a third section 206. The first section 202 includes a plurality of first gas flow openings 208 The second section 204 includes a plurality of second gas flow openings 210 which are larger than the first gas flow openings 208. The third section 206 includes a plurality of third gas flow openings 212 which are larger than the second gas flow openings 210. A top side surface 214 extends across all three sections 202, 204 and 206 of the filter sheet 200, and surrounds all of the gas flow openings 208, 210 and 212. A bottom side surface 216 parallel to the top side surface 214 also extends across all three sections 202, 204 and 206, and also surrounds all of the gas flow openings 208, 210 and 212. The filter sheet 200 is formed of a material impervious to the gas generated by a gas generating material in a vehicle occupant safety apparatus, such as sheet metal, and the gas flow openings 208, 210 and 212 are formed as perforations or stamped out openings in the filter sheet 200.

The first, second and third gas flow openings 208, 210 and 212 are arranged in adjacent rows extending lengthwise along the filter sheet 200. If a row of the first gas flow openings 208 were superimposed over the adjacent row of second gas flow openings 210, the first gas flow openings 208 would overlie the areas of the top side surface 214 between the second gas flow openings 210. If a row of the second gas flow openings 210 were superimposed over the adjacent row of third gas flow openings 212, the second gas flow openings 210 would overlie the areas of the top side surface 214 between the third gas flow openings 212.

As shown in FIG. 8, the filter sheet 200 is rolled into a coil shape. The third section 206 extends in a loop around the second section 204, and the second section 204 extends in a loop around the first section 202. The sections 202, 204 and 206 thus define filter layers which have parallel opposite side surfaces and which are arranged in radially spaced positions.

As shown in FIG. 9, an area of the top side surface 214 at the third section 206 is located radially opposite each one of the second gas flow openings 210 at the second section 204. An area of the top side surface 214 at the second section 204 is located radially opposite each one of the first gas flow openings 208 at the first section 202. Tortuous gas flow paths are thus defined through the gas flow openings 208, 210 and 212, and through the spaces between the radially adjacent sections 202, 204 and 206 of the coil shaped filter sheet 200.

One or more layers of screen material 220 are preferably included, as shown in FIG. 8.

The coil shaped filter sheet 200 is receivable in a housing, such as the housing 158 shown in FIG. 6, to remove material from gas generated by a gas generating material in a vehicle occupant safety apparatus. When gas flows along a tortuous gas flow path extending radially outwardly, the successively larger gas flow openings 208, 210 and 212 accommodate a pressure drop in the flowing gas.

From the above description of the above invention, those skilled in the art will perceive improvements, changes and modifications. Such improvements, changes and modifications are intended to be included within the scope of the appended claims.

Having described the invention, the following is claimed:

1. A filter for removing material from gas generated by a gas generating material in a vehicle occupant safety apparatus, the safety apparatus including an inflatable airbag which restrains a vehicle occupant when inflated by the gas, and a housing which contains the gas generating material and which has at least one gas exit opening, said filter comprising:

a filter sheet having a first section, a second section, a side surface extending across said sections, and a plurality of gas flow openings at each of said sections, said filter sheet comprising an impervious material, said gas flow openings being punched out openings through said impervious material;

said filter sheet being rolled into a coil shape with said second section extending in a loop around said first section to define a space between said sections, and with said side surface having an area radially opposite each gas flow opening at said first section to define a tortuous gas flow path through said gas flow openings and said space; and said filter sheet being receivable in the housing in said coil shape with said tortuous gas flow path extending between the gas generating material and the gas exit opening.

2. A filter as defined in claim 1 wherein said second section of said filter sheet includes gas flow openings which are larger than gas flow openings at said first section.

3. An inflator assembly for an inflatable vehicle occupant airbag, said inflator assembly comprising:

a housing having a longitudinal axis, an outer cylindrical wall, an inner cylindrical wall coaxial with said outer cylindrical wall to define an annular space between said walls, a rearward axial end wall and a forward axial end wall having at least one gas exit opening;

a wire mesh container for containing a gas generating material, said container being an endless tube having a ring shape, said container having a position in said annular space in said housing adjacent to said rearward axial end wall of said housing;

a filter module having a position in said housing between said container and said gas exit openings, said filter module comprising a group of filter components including baffle plates and screens in a stacked array, said baffle plates and screens alternating in said stacked array, said baffle plates having opposite planar side surfaces including gas flow openings, each of said gas flow openings being offset from each gas flow opening in an adjacent baffle plate to define a tortuous gas flow path axially through said baffle plates, said group of filter components being ring shaped members received in said annular space in said housing; and a burst foil sheet supported in a position to block gas flow axially between said filter module and said gas exit opening, said burst foil sheet being adapted to burst under a predetermined pressure to permit said gas flow.

4. A filter for removing material from gas generated by a gas generating material in a vehicle occupant safety apparatus, the safety apparatus including an inflatable airbag which restrains a vehicle occupant when inflated by the gas, and a housing which contains the gas generating material and which has at least one gas exit opening, said filter comprising:

a plurality of filter layers each having parallel opposite side surfaces and at least one gas flow opening extending between said side surfaces, said filter layers being arranged in adjacent positions with spaces between the side surfaces of adjacent filter layers, and with each filter layer having a side surface area opposite each gas flow opening in an adjacent filter layer to define a tortuous gas flow path through said spaces and said gas flow openings;

said filter layers being receivable in the housing in said adjacent positions with said tortuous gas flow path extending between the gas generating material and the gas exit opening; and said filter layers being radially adjacent sections of a coil shaped filter sheet.

5. A container for gas generating material used in a vehicle occupant safety apparatus comprising an inflatable airbag and a housing for said airbag, said container comprising:

a wire mesh structure for containing the gas generating material, said wire mesh structure being receivable in the housing and permitting the entry into said container of an ignition signal in the form of heat and flame of combustion, said wire mesh structure having an endless tubular shape formed in a ring.

6. An inflator assembly for a vehicle occupant safety apparatus comprising an inflatable airbag, said inflator assembly comprising:

a housing for containing a gas generating material which emits gas for inflating the airbag;

a container in said housing for containing the gas generating material, said container comprising a wire mesh structure permitting entry into said container of an ignition signal in the form of heat and flame of combustion, said wire mesh structure having an endless tubular shape formed in a ring; and an ignitable material for emitting said ignition signal, said ignitable material having a position in said housing adjacent to said container.

7. An inflator assembly for a vehicle occupant safety apparatus including an inflatable airbag, said inflator assembly comprising:

a housing containing a gas generating material which generates gas for inflating the airbag, said housing having at least one gas exit opening;

filter means for removing material from gas generated by said gas generating material, said filter means comprising a first baffle plate located in said housing between said gas generating material and said gas exit opening, said first baffle plate having an axis and a central gas flow opening centered on said axis, said central gas flow opening defining a passage for gas to flow through said first baffle plate along said axis, said first baffle plate further having a first surface surrounding said central gas flow opening and blocking the flow of gas through said first baffle plate other than through said central gas flow opening; and said filter means further comprising a second baffle plate located in said housing in a position spaced axially from said first baffle plate and defining a gas flow space between said baffle plates, said second baffle plate having a circular array of gas flow openings extending around said axis at a location spaced radially from said central gas flow opening in said first baffle plate, said gas flow openings in said array defining passages for gas to flow axially through aid second baffle plate, said second baffle plate further having a second surface blocking the flow of gas through said second baffle plate other than through said gas flow openings in said array, said second surface having a surface area located axially opposite the entire area of said central gas flow opening.

8. An inflator assembly as defined in claim 7 wherein the sum of the areas of said gas flow openings in said circular array is approximately equal to said area of said central gas flow opening.

9. An inflator assembly as defined in claim 7 wherein at least one of said first and second baffle plates is one of a pair of identical baffle plates located on opposite axial sides of the other of said first and second baffle plates.

10. An inflator assembly for a vehicle occupant safety apparatus including an inflatable airbag and a gas generating material for generating gas which inflates the airbag, said inflator assembly comprising:

a housing having a cylindrical wall with a first end and a second end, said cylindrical wall defining a internal space for containing the gas generating material between said ends;

said housing further having a plurality of gas exit openings communicating said internal space with the exterior of said housing, said gas exit openings comprising a first gas exit opening adjacent to said first end of said cylindrical wall and a second gas exit opening adjacent to said second end of said cylindrical wall;

filter means for removing material from the gas generated by the gas generating material in said housing, said filter means comprising a first filter module located in said housing between said internal space and said first gas exit opening and a second filter module located in said housing between said internal space and said second gas exit opening; and each of said filter modules comprising a plurality of filter layers, each of said filter layers having parallel opposite side surfaces and at least one gas flow opening extending between said side surfaces, said filter layers being arranged in adjacent positions with spaces between the side surfaces of adjacent filter layers, and with each filter layer having a side surface area opposite each gas flow opening in an adjacent filter layer to define a tortuous gas flow path through said spaces and said gas flow openings, whereby said filter modules define a pair of tortuous gas flow paths extending in opposite directions from said internal space toward respective ones of said first and second gas exit openings.

11. An inflator assembly as defined in claim 10 wherein said filter layers are disk shaped baffle plates spaced from each other along an axis, at least one of said baffle plates having a central gas flow opening centered on said axis, said central gas flow opening defining a passage for gas to flow through said one baffle plate along said axis, at least one other baffle plate adjacent to said one baffle plate having a surface area located axially opposite the entire area of said central gas flow opening for gas to flow axially from said central gas flow opening into contact with said surface area, said other baffle plate further having a circular array of gas flow openings extending around said axis at a location spaced radially from said central gas flow opening.

* * * * *

UNITED STATES PATENT AND TRADEMARK OFFICE
CERTIFICATE OF CORRECTION

PATENT NO. : 5,100,171

DATED : March 31, 1992

INVENTOR(S) : Ernst M. Faigle and John H. Semchena

It is certified that error appears in the above-identified patent and that said Letters Patent is hereby corrected as shown below:

Column 12, Line 17, Claim 7, change "aid" to --said--.

Signed and Sealed this

Eighth Day of June, 1993

Attest:

MICHAEL K. KIRK

*Attesting Officer*  *Acting Commissioner of Patents and Trademarks*